Jan. 12, 1937.　　　F. A. HEADSON　　　2,067,396
OIL RECLAIMER
Filed Oct. 18, 1933　　　8 Sheets-Sheet 1

WITNESSES
Irwin J. Rose
L. E. Kilian

INVENTOR
Frank A. Headson
By R. S. Caldwell
ATTORNEY

Jan. 12, 1937. F. A. HEADSON 2,067,396
OIL RECLAIMER
Filed Oct. 18, 1933 8 Sheets-Sheet 2
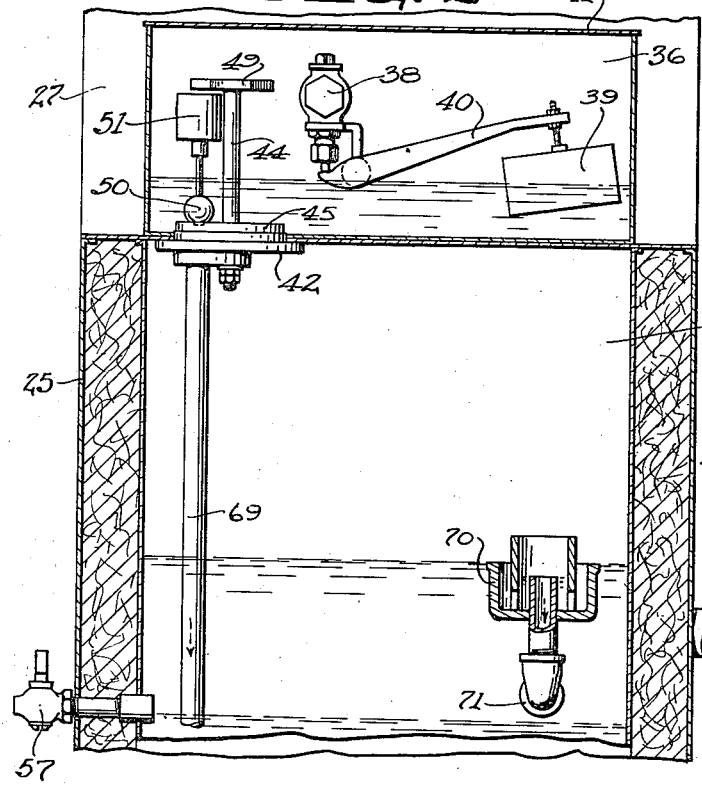
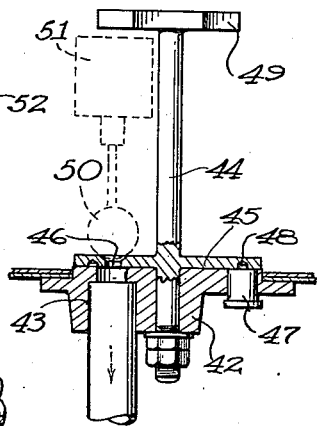
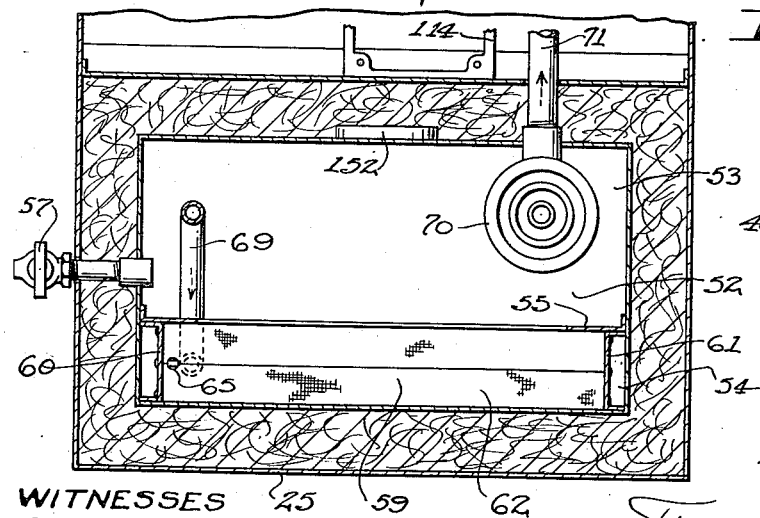
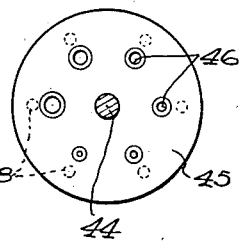
WITNESSES
Irwin J. Rose
L. E. Kilian
INVENTOR
Frank A. Headson
By R. S. Caldwell
ATTORNEY

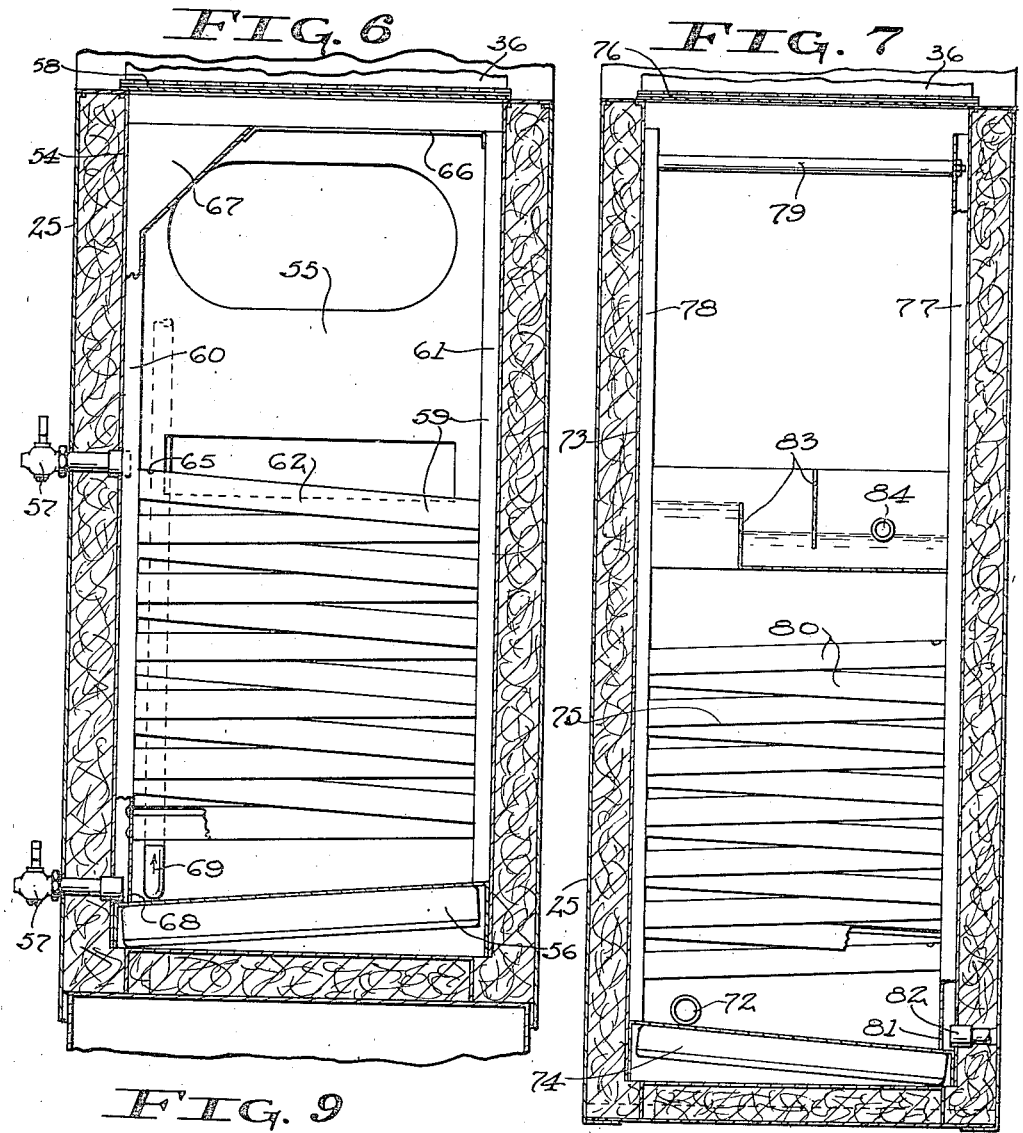

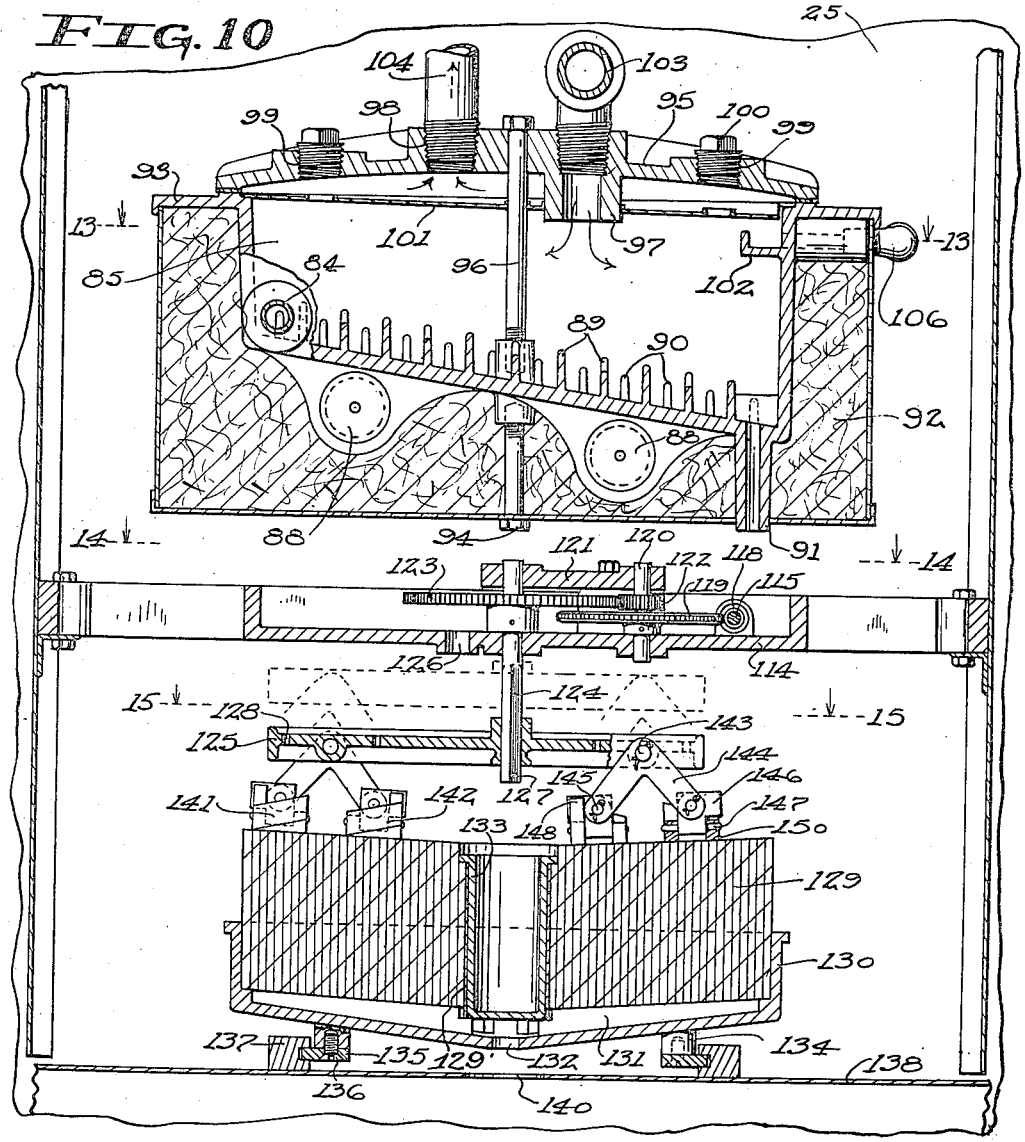

Jan. 12, 1937.   F. A. HEADSON   2,067,396
OIL RECLAIMER
Filed Oct. 18, 1933   8 Sheets-Sheet 5
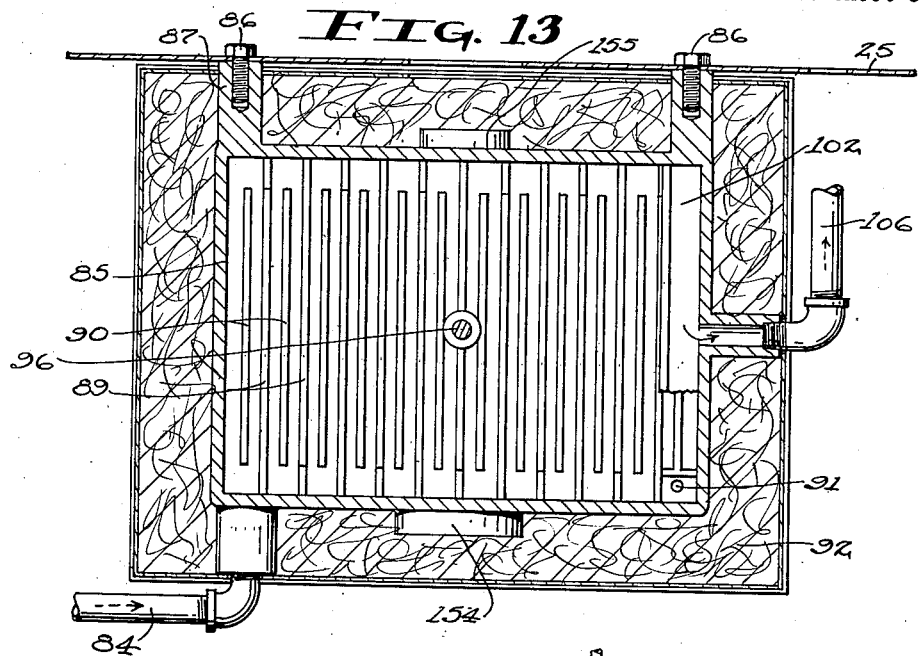
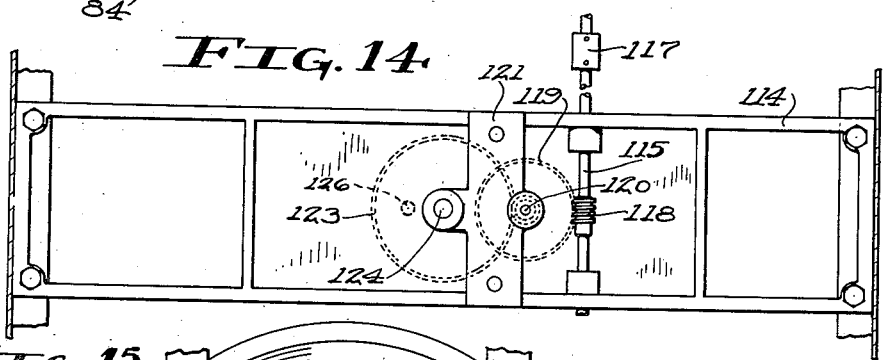
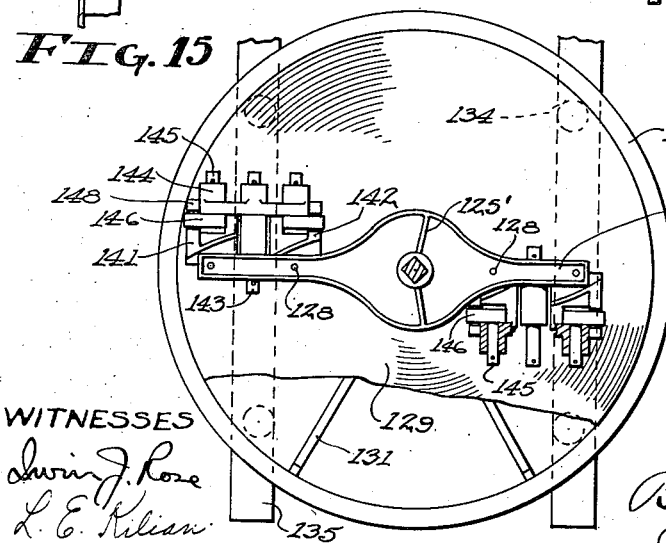
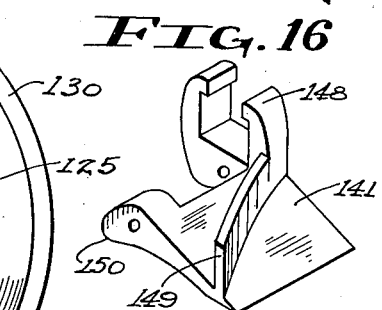
WITNESSES
Irving J. Rose
L. E. Kilian
INVENTOR
Frank A. Headson
By R. A. Caldwell
ATTORNEY

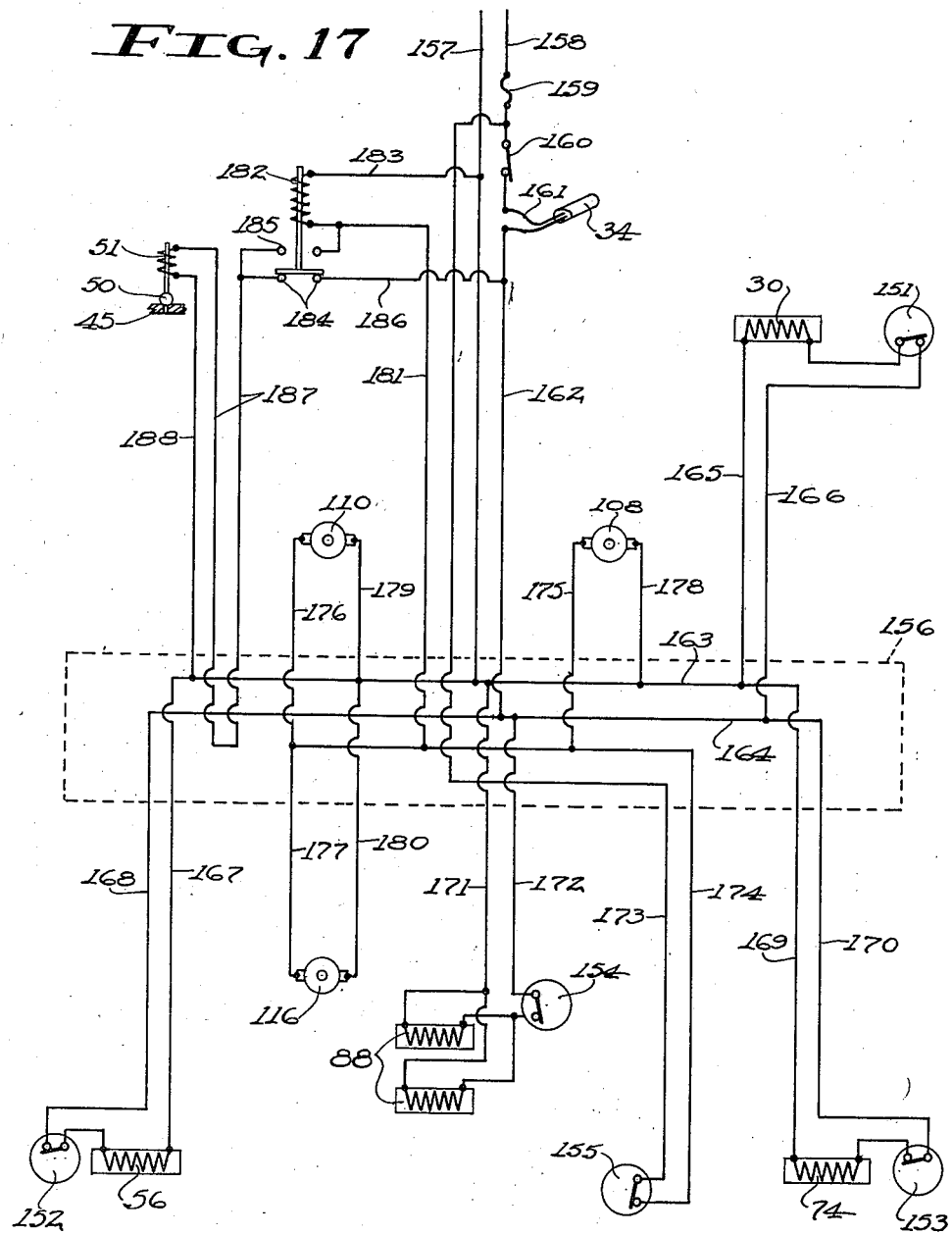

Jan. 12, 1937. F. A. HEADSON 2,067,396
OIL RECLAIMER
Filed Oct. 18, 1933 8 Sheets-Sheet 7
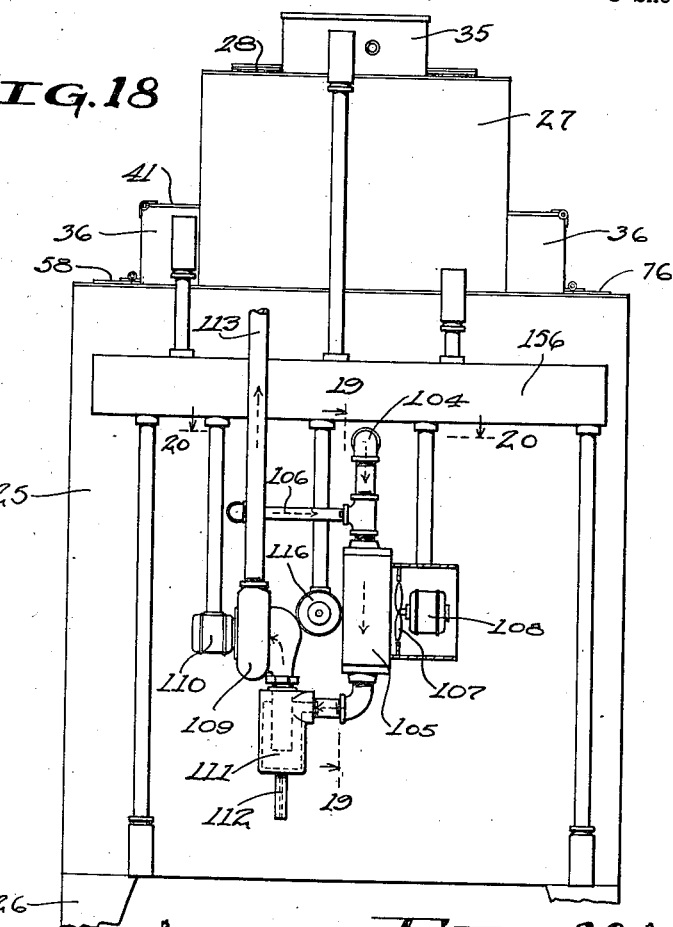
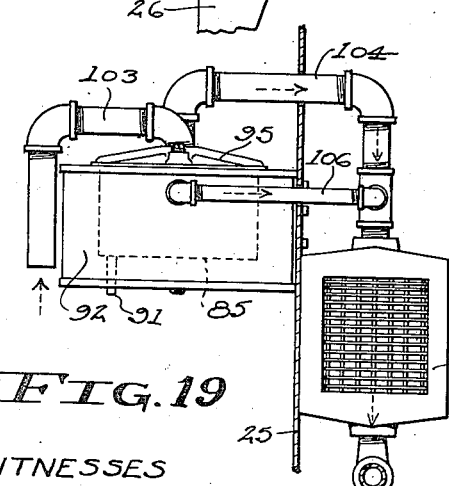
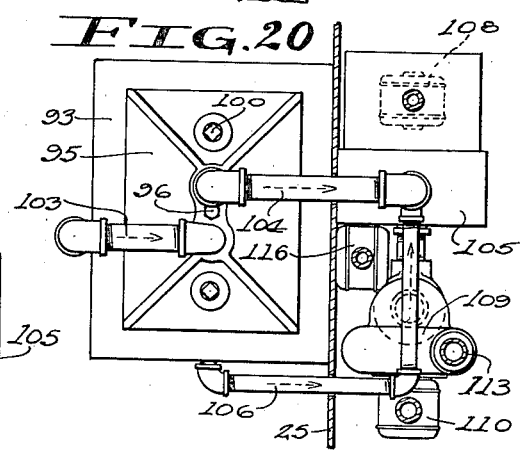
WITNESSES
Irwin J. Rose
L. E. Kilian
INVENTOR
Frank A. Headson
By R. A. Caldwell
ATTORNEY Jan. 12, 1937. F. A. HEADSON 2,067,396
OIL RECLAIMER
Filed Oct. 18, 1933 8 Sheets-Sheet 8
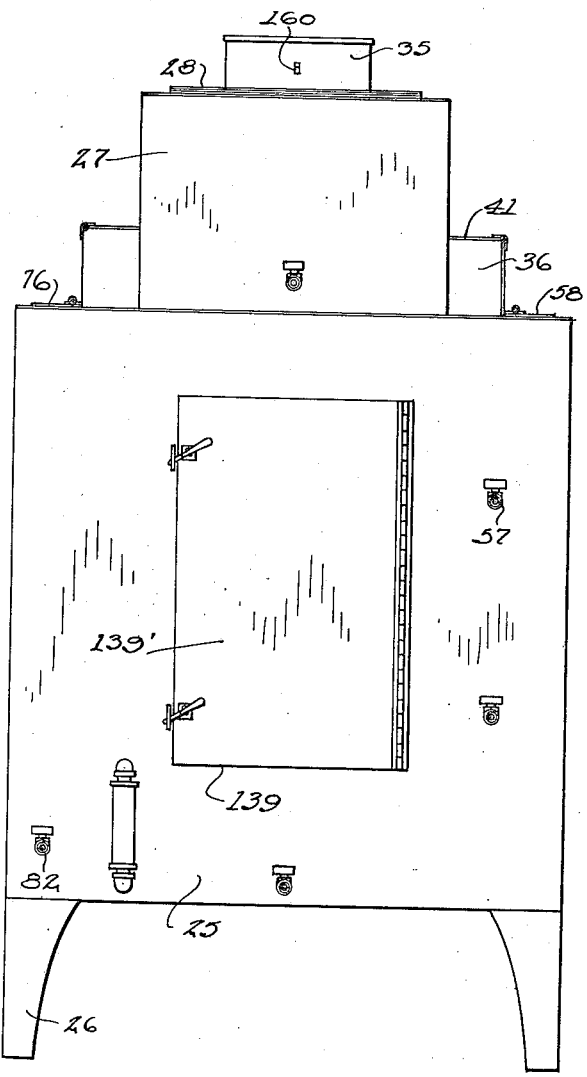
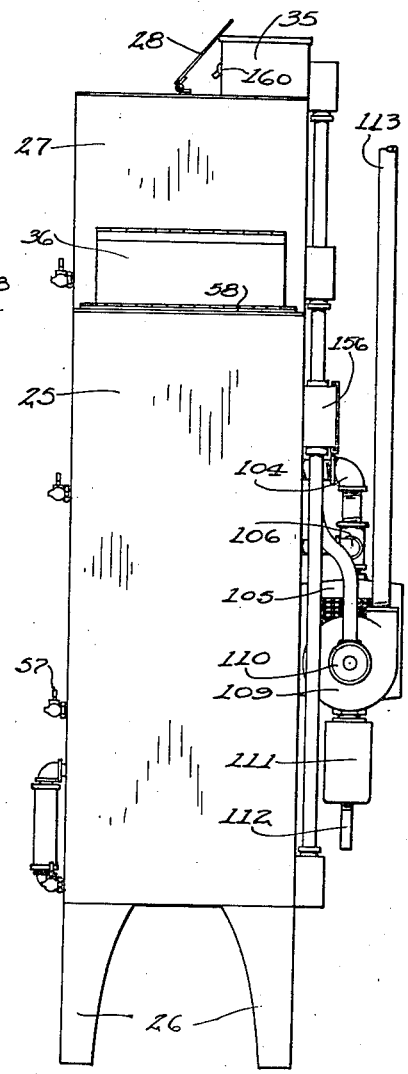
WITNESSES
Irving J. Rose
L. E. Kilian
INVENTOR
Frank A. Headson
By R. S. Caldwell
ATTORNEY Patented Jan. 12, 1937

2,067,396

UNITED STATES PATENT OFFICE 2,067,396

OIL RECLAIMER

Frank A. Headson, Milwaukee, Wis.

Application October 18, 1933, Serial No. 694,047

6 Claims. (Cl. 196—16)

The invention relates to apparatus for reclaiming used lubricating oil.

An object of the invention is to provide a compact, self-contained and automatically operated oil reclaimer by which used lubricating oils can be restored to their proper condition.

Another object of the invention is to provide an oil reclaimer having a still the temperature of which controls the oil flow and the operation of the device, there being ventilating means for the still.

A further object of the invention is to provide an oil reclaimer having neutralizing and scrubbing compartments through which the oil is passed, the compartments being equipped with effective filter screens which can be readily cleaned.

A further object is to provide oil filtering means comprising a filter pad into which oil flows by gravity and on which bears movable scraper shoes, the filter pad compartment being ventilated through the still.

A further object is to provide an oil reclaimer in which oil flows by gravity through the several instrumentalities.

The invention further consists in the several features hereinafter described and claimed.

In the accompanying drawings,

Fig. 2 is a sectional elevation taken along the line 2—2 of Fig. 1;

Fig. 3 is a sectional view taken along the line 3—3 of Fig. 1;

Fig. 4 is a sectional elevation of a selector valve for oils of different body;

Fig. 5 is a bottom plan view of an adjustable valve member of the valve of Fig. 4;

Fig. 6 is a sectional elevation taken along the line 6—6 of Fig. 1;

Fig. 7 is a sectional elevation taken along the line 7—7 of Fig. 1;

Fig. 8 is a transverse sectional view of a filter screen element;

Fig. 9 is a detail view of the screen element before shaping;

Fig. 10 is a sectional elevation of the still and subjacent filter of Fig. 1;

Fig. 11 is a plan view of a still baffle plate;

Fig. 12 is an edge view of the baffle plate;

Fig. 13 is a sectional view of the still taken along the line 13—13 of Fig. 10;

Fig. 14 is a sectional view taken along the line 14—14 of Fig. 10;

Fig. 15 is a sectional view taken along the line 15—15 of Fig. 10;

Fig. 16 is a perspective view of one of the filter pad scrapers;

Fig. 17 is a wiring diagram for the reclaimer;

Fig. 18 is a rear elevation of the reclaimer;

Fig. 19 is a sectional view taken along the line 19—19 of Fig. 18;

Fig. 20 is a sectional view taken along the line 20—20 of Fig. 18;

Fig. 21 is a front elevation of the reclaimer, and

Fig. 22 is a side elevation of the reclaimer.

Figure 1:
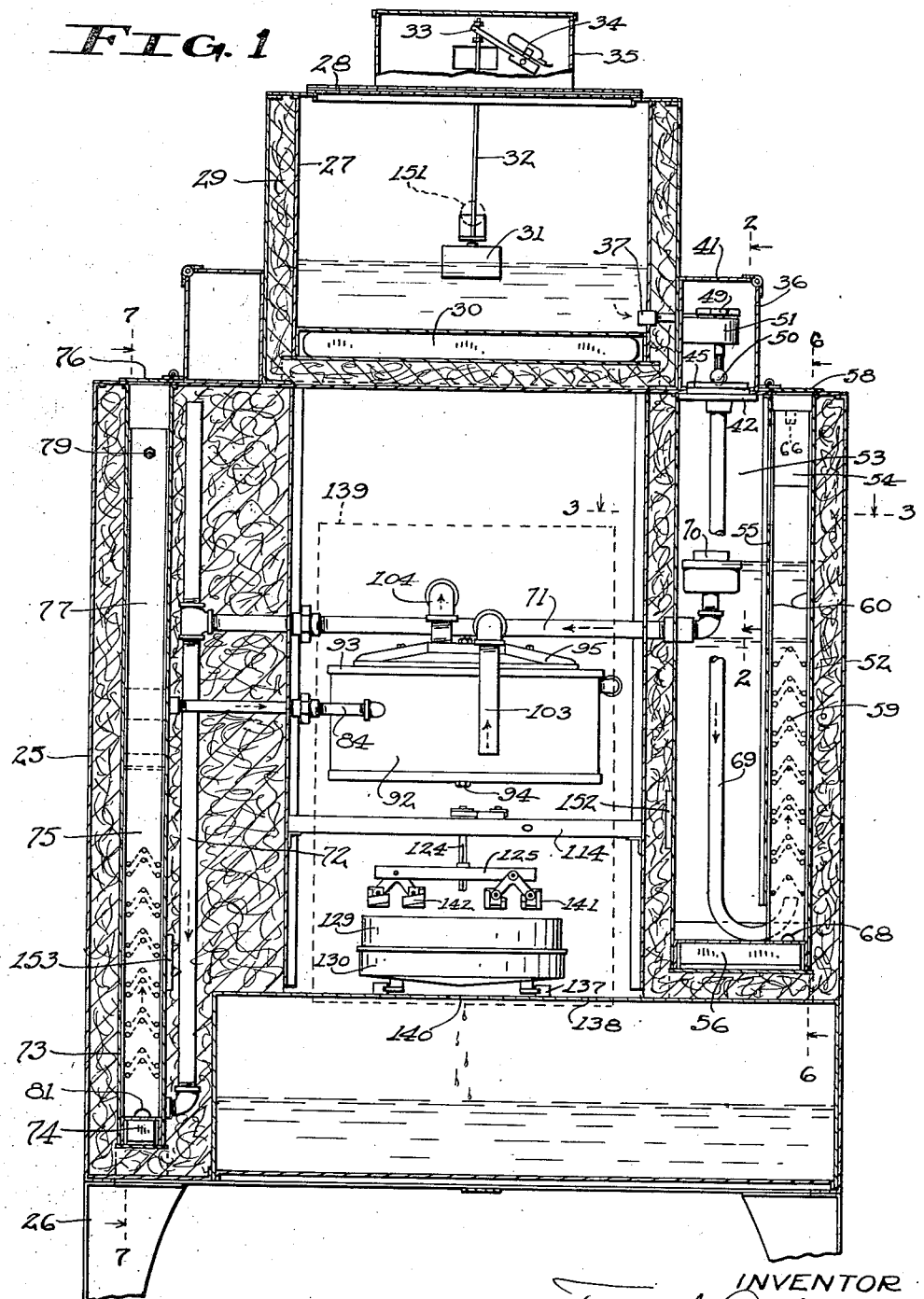
Fig. 1 is a sectional elevation, looking rearwardly, of an oil reclaimer embodying the invention, the sectional plane being near and parallel to the front wall of the device.

In these drawings, 25 designates an outer housing provided with supporting legs 26 and having a reduced upper end in which is mounted a receiving tank 27 for oil to be reclaimed, the tank having a hinged cover 28. The receiving tank is surrounded by suitable heat-insulating material 29, and an electric heater 30 is mounted at the bottom wall of the tank for heating the oil introduced into the tank. A float 31 in the tank 27 has a stem 32 connected to a tiltably mounted lever 33 carrying a mercury tube switch 34, the function of which is hereinafter explained. The switch is mounted in a compartment 35 above the rear portion of the receiving tank 27.

A small regulating tank 36 is disposed laterally of the receiving tank 27 and is connected to the lower portion of the latter tank by a pipe 37. Oil is admitted from the receiving tank to the regulating tank through the pipe 37 and through a valve 38 (Fig. 2) controlled by a float 39 in the latter tank acting on a pivotally mounted lever 40. The regulating tank is provided with a hinged cover 41.

A valve base 42 is secured to the bottom wall of the regulating tank and has an outlet opening 43. A vertical valve stem 44 is rotatably mounted in the valve base 42 and carries a disk 45 resting on the flat upper face of the valve base. A circular series of ports 46 of different diameters are formed in the disk to selectively register with the outlet opening 43 in the base for controlling the flow of oils of different body. A spring detent 47 is carried by the valve base and cooperates with a circular series of cavities 48 formed in the bottom face of the disk to hold the disk in adjusted position. A notched handwheel 49 is secured to the upper end of the valve stem 43 to adjust the disk.

The upper ends of the ports 46 in the disk 45 are chamfered to form valve seats for a ball valve 50 above the outlet opening 43 in the valve base 42. The ball valve 50 is lifted by a solenoid 51 to permit the flow of oil from the regulating tank, the solenoid being controlled in a manner hereinafter explained. The head of oil above the valve base is maintained substantially constant by the float-controlled valve 38.

A neutralizing tank 52 is mounted within the housing 25 near one side wall thereof, the tank being suitably heat-insulated and divided into two compartments 53 and 54 by a vertical partition wall 55. The tank 52 holds a suitable neutralizing solution, such as a solution of basic tri-phosphate of soda, which is heated by an electric heater 56 mounted at the bottom wall of the tank. The partition 55 is spaced from the bottom wall and is apertured adjacent the solution level to permit circulation. Pet cocks 57 are provided for determining the solution level and for draining the solution.

The tank compartment 54 is closed at the top by a hinged cover 58 and receives therein a removable filter or screen grid 59 which slidably fits in place. The filter comprises spaced vertical channels 60 and 61 at opposite edges, having their webs at the inner sides and joined by a series of inclined screens 62 of inverted V-shaped cross-section (Fig. 8). Each screen is formed of a sheet of fine mesh brass or other wire fabric 63 (Fig. 9) bent to shape and supported by three parallel rods 64, one at the ridge and two at opposite edges. The wire fabric is soldered in place and the ends of the screen are closed. The rods 64 are riveted or otherwise secured to the webs of the channels 60 and 61. The inclined screens are spaced one above the other, and each has an oil vent opening 65 near its elevated end, adjacent screens being inclined in opposite directions. A lifting bar 66 connects the upper ends of the channels 60 and 61. The upper end of the channel 60 is flared to form a funnel 67 (Fig. 6) to introduce the solution, and the lower end of the channel has a notch 68 to pass the solution.

A pipe 69 is secured to the valve base 42 at the bottom of the regulating tank 36 and discharges oil downwardly from the outlet opening 43 in the valve base. The pipe extends to the bottom of the neutralizing tank and has a reversely curved lower end which discharges upwardly into the filter compartment 54 and below the lower end of the lowermost screen 62 (Figs. 1 and 6). The warm oil flows upwardly along the screens in a sinuous path to be neutralized by the solution and to deposit foreign matter on the screens, the foreign matter being coagulated by the solution. As soon as a globule of oil is freed of its foreign matter it will pass upwardly through the screens in a more or less direct course. The upward movement of the oil through and along the screens induces a circulatory movement of the solution between the compartments 53 and 54.

The filtered and neutralized oil collects above the solution and flows into a weir-forming trap 70 (Figs. 1 and 2) and thence by gravity through a horizontal pipe 71 to the other side of the housing. The pipe 71 is connected to a vertical pipe 72, the upper part of which forms a vent and the lower end of which is discharged into the bottom portion of a scrubbing tank 73 which is suitably heat-insulated and which is heated by an electric heater 74 at its bottom wall. A filter or screen grid 75, somewhat similar to the filter 59, slidably fits in the scrubbing tank and is removable through the upper end of the tank which is normally closed by a hinged cover 76. The filter 75 comprises spaced vertical channels 77 and 78 at opposite edges connected by a lifting bar 79 at the top and by a series of inclined screens 80 similar to the screens 62. The lower end of the channel 77 has a notch 81 permitting water, sludge, and solution removed from the oil to be drained through a pipe 82. Above the screens 80, the rising oil flows into a trap-forming baffle compartment 83, from which it is discharged by gravity through a pipe 84.

The pipe 84 is connected to a still 85 which is supported on the rear wall of the housing 25 by screws 86 tapped into lugs 87 formed on the still. The still has a sloping bottom wall, the outer side of which supports electric heating elements 88, and the inner side of which has integrally formed thereon a series of parallel ribs 89 and 90 extending transversely of the still. Each rib 89 is notched at one end and forms a dam, and successive ribs 89 have their notches at opposite ends. The ribs 90 are shorter than the width of the still. The ribs 89 and 90 provide an extensive heating surface and cause the oil to flow in a sinuous course. The oil enters the still at an upper corner of the sloping bottom wall, and the treated oil is discharged at a lower corner of the bottom through a downwardly projecting nozzle 91. The still is surrounded by an insulating jacket 92 held in place by a marginal flange 93 at the upper edge of the still and by a screw 94 threaded into the bottom of the still. A cover 95 is secured to the still by a central clamping bolt 96 and is provided with ventilating openings 97 and 98, and with a pair of thermometer well openings 99 which are normally closed by pipe plugs 100. A rectangular sheet metal baffle plate 101 is clamped at its edges at the upper part of the still by the cover and is bent to form a shallow trough (Fig. 12) which discharges into a cross trough 102 formed in the still adjacent the deeper end wall thereof. The baffle plate has perforations 102' near its edges and also has perforations 102'' to pass the bolt 96, the air inlet 97, and the thermometer wells, the latter perforations being surrounded by upstanding flanges.

The still opening 97 is connected by an inlet pipe 103 with the interior space of the casing 25, and the opening 98 is connected by a pipe 104 leading to a condenser 105 mounted on the outer side of the rear wall of the housing. A bleeder pipe 106 connects the still trough 102 with the condenser. The condenser is air-cooled by a fan 107 driven by an electric motor 108. The odorous still vapors are drawn through the condenser by an exhaust or suction fan 109 driven by an electric motor 110. The vapors and entrained liquid from the condenser pass through a separator 111, from which water and a light oil of the penetrating type drains through a pipe 112 of small diameter. The non-condensed vapors are discharged by the exhaust fan through a pipe 113.

The oil treated in the still drains therefrom through the nozzle 91 and into a horizontal trough-forming bracket or frame 114 (Figs. 10 and 14) secured within the housing. A horizontal shaft 115 is journalled in the bracket and is driven by an electric motor 116 (Fig. 18) mounted on the rear wall of the housing 25 and connected to the shaft by a flexible coupling 117. The shaft 115 carries a worm 118 which meshes with a worm wheel 119 carried on a vertical shaft 120 journalled in the bracket 114 and in a bearing plate 121 secured above the bracket. The vertical shaft 120 carries a pinion 122 which meshes with a gear 123 on a vertical shaft 124 journalled in the bracket and bearing plate. Below the bracket the shaft 124 has a downwardly projecting squared portion on which is slidably mounted against relative rotation a trough-forming arm 125 (Figs. 10 and 15) having an enlarged central portion which registers with an oil drain opening 126 in the bracket or frame. The oil draining from the still into the bracket lubricates the gearing on the bracket and drains through the opening 126 into the rotary trough-forming arm 125 which turns at a slow speed. The arm 125 is divided into two basins by an angular transverse rib 125' at its hub portion, and the downward movement of the arm is limited by a pin 127 on the shaft 124. Drain openings 128 are formed near opposite ends of the arm at different radii from the shaft 124, and the longer end of the arm receives more oil than the shorter end.

Oil drops from the rotary arm 125 onto a filter pad 129 which preferably consists of a ribbon of cellulose cotton having a crepe surface and wound into a cylindrical block or disk about a cardboard core 129', the axis of the block extending vertically. The pad is supported in a cup-shaped holder 130 and rests on radial ribs 131 formed on the bottom wall of the holder. The bottom wall of the holder is conical and converges downwardly to a central drain opening 132. The core 129' of the pad has fitted therein a sediment cup 133 to receive foreign matter. The cup rests on the notched inner ends of the ribs 131 and the top surface of the pad slopes downwardly to the upper edge of the cup which is marginally flanged.

The bottom wall of the pad holder has downwardly projecting bosses 134 to which a pair of spaced parallel horizontal bars 135 are secured by screws 136. The bars are slidably guided in tracks 137 mounted on the top wall of a tank 138 below the pad holder, so that the holder may be removed through a doorway 139 in the front wall of the casing 25 for replacing the pad. The doorway is closed by a hinged door 139'. The top wall of the tank 138 has an opening 140 registering with the drain opening 132 in the pad holder 130 to receive the filtered oil, which is ready for use and is drawn from the tank at suitable intervals.

The upper surface of the filter pad 129 tends to become coated with a deposit which prevents free passage of the oil. This deposit is removed by a plurality of scraper shoes 141 and 142 which slidably bear on the upper surface of the pad, and are impelled by the rotary arm 125. The arm 125 carries a pair of parallel horizontal transversely extending pins 143 at opposite sides of its axis. Each pin pivotally carries a bell-crank 144 on the lower ends of which are pins 145. An L-shaped connector 146 is pivotally mounted on each pin and has a downwardly projecting leg carrying a cross pin 147. Each scraper shoe is notched at its rear edge to receive the downwardly projecting connector leg and is pivoted thereon by the cross pin 147. At one side edge the scraper shoe is provided with spaced upstanding jaws 148 loosely receiving between them the laterally projecting leg of the connector 146 to limit the swinging movement of the scraper. On each scraper shoe 141 (Fig. 16) the jaws 148 are at one side edge, while on each scraper shoe 142 the jaws are at the other side edge. Each scraper shoe has a diagonal upstanding flange 149 which works foreign matter toward the central sediment cup 133. The bottom of each scraper shoe is arched, as seen in Fig. 16, and each has a front scraping edge and a rounded rear heel 150 which rest on the pad, the weight being so distributed as to avoid excessive pressure on the pad at the scraping edge. The scraper shoes also have the effect of pressing the filter pad, the resilience of which restores it to normal shape in condition to readily absorb oil.

The oil reclaimer is equipped with a number of thermostatic switches to insure operation of the device in a desired temperature range. The receiving tank 27 has a thermostatic switch 151 at its rear wall. The neutralizing tank 52 and neutralizing tank 73 have respective thermostatic switches 152 and 153 at their side walls. The still 85 has a pair of thermostatic switches 154 and 155 at opposite side walls.

The rear wall of the casing 25 carries a junction box 156 from which conduits lead to various parts of the casing. A pair of line wires 157 and 158 (Fig. 17) enter the compartment 35 at the upper end of the housing. The latter wire is provided with a fuse 159 and a hand switch 160 (Fig. 17) and is connected by a conductor 161 with one terminal of the mercury tube switch 34. The other terminal of the mercury tube switch is connected to a wire 162. The line wire 157 and conductor 162 are connected to respective bus wires 163 and 164 in the junction box 156. The bus wires are connected by wires 165 and 166 to the receiving tank heater 39, one of the latter wires including the thermostatic switch 151. The bus wires are similarly connected to the neutralizing tank heater and thermostatic switch 152 by wires 167 and 168, to the scrubbing tank heater 74 and thermostatic switch 153 by wires 169 and 170, and to the still heaters 88 and thermostatic switch 154 by wires 171 and 172. One terminal of the still-heated thermostatic switch 155 is connected by a wire 173 with the line wire 158 between the fuse 159 and the hand switch 160, so as not to be affected by the opening or closing of the hand switch. The other terminal of the thermostatic switch 155 is connected with a bus wire 174 from which extend wires 175, 176, and 177 leading to terminals of the condenser motor 108, the exhaust motor 110 and the pad cleaner motor 116. The other terminals of these motors are connected by respective wires 178, 179, and 180 joining the bus wire 163. A wire 181 connects the bus wire 174 with one terminal of the winding of a relay switch 182, the other terminal of which is connected to the line wire 157 by a wire 183. The relay switch 182 is in the nature of a single-pole double-throw switch having terminals 184 and 185. One of the terminals 185 is connected to the wire 181, and one of the terminals 184 is connected by a wire 186 with the wire 162. The other terminals 184 and 185 are connected by a wire 187 with one terminal of the solenoid 51, the other terminal of which is connected by a wire 188 joining the bus wire 163. The relay switch 182 is hand set to a position bridging the terminals 184 and when energized is shifted to a position bridging the terminals 185. When the relay switch 182 is thereafter de-energized, the switch is opened.

The still is maintained at a temperature from 450° to 475° F. by the thermostatic switch 154, which is preferably adjustable. If the still temperature falls below 380° F. the thermostatic switch 155 opens. The thermostatic switches 151, 152, and 153 for the various tanks maintain an operating temperature of about 160° F.

When a quantity of oil is to be reclaimed, it is preferably subjected to a preliminary settling operation. It is then poured into the receiving tank 27, which may be done with the apparatus at room temperature. The hand switch 160 is closed, and the mercury tube switch 34 closes as soon as the oil rises, establishing circuits through the various heating elements. With the relay switch 182 in hand-set position, a circuit is also established through the solenoid 51 by way of the wires 186, 187, 188, and 163, thus opening the control valve 50 in the regulating tank 36. Oil flows from the receiving tank into the regulating tank until the float 39 closes the valve 38. The ported valve disk 45 is turned to a position corresponding to the body of the oil being reclaimed, a heavier oil requiring a larger port. Oil flows slowly through the valve disk port into the pipe 69 from which it discharges upwardly into the filter or screen grid 59 in the neutralizing tank. The oil is here neutralized and freed of a considerable amount of suspended matter.

The neutralized and filtered oil flows by way of the trap 70 and pipe 71 to the lower end of the scrubbing tank 73 along which the oil rises and is further cleaned, ready to flow into the still 85 by way of the trap compartment 83 and pipe 84. During the slow passage of the oil from the receiving tank to the still, the various tanks and the still reach their operating temperatures, so that the oil flows more freely. As soon as the flow control thermostatic switch 155 reaches 380° F. it closes a circuit through the winding of the relay switch 182 by way of the wires 173, 174, 181, and 183, thus bridging the contacts 185 to shift the control of the solenoid valve 50, 51 to this thermostatic switch. The solenoid valve thereafter remains open, but will close whenever the temperature of the still drops below 380° F. The closing of the thermostatic switch 155 also establishes motor circuits setting in operation the condenser motor 108, the exhaust motor 110 and the pad cleaner motor 116. These motors stop as soon as the still temperature drops sufficiently to open the thermostatic switch 155.

In the still, water and volatile substances are driven from the oil and are drawn from the still through the condenser 105, trap 111, and exhaust fan 109. Any vapors condensing at the top of the still flow along the plate 101 into the trough 102 from which the condensate is removed through the bleeder pipe 106. Vapors in the filter pad compartment are drawn off through the still by way of the pipe 103. The reclaimer is thus kept free from unpleasant odors.

The oil drops from the discharge nozzle 91 of the still onto the trough-forming bracket or frame 114 where it lubricates the gearing for the pad cleaner before being discharged by gravity through the opening 126 and onto the rotary trough-forming arm 125. From the arm 125 the oil is distributed through the drain openings 128 onto the upper surface of the filter pad 129 and seeps through the pad. The scraper shoes 141 and 142 scrape the deposit from the upper surface of the pad the deposit finding its way into the central sediment cup 133. The scrapers also press the pad in their travel. The filter removes paraffin and asphaltic material from the oil. The oil flows through the filter pad parallel to the plies and the foreign matter is deposited mainly between the plies. The filtered oil is drained from the opening 132 in the pad holder and enters the finished oil tank 138 from which it is drawn for use.

When the oil in the receiving tank 27 drops to a low level, the float 31 tilts the mercury tube switch 34 to its open position, thereby shutting off the current to the various heating elements. However, to prevent flashing in the still, the motors remain in operation and the solenoid valve 50, 51 remains open until the still cools to about 380° F. At this temperature the thermostatic switch 155 opens to stop the motors and close the valve.

At suitable intervals, the screen grids in the neutralizing tank and scrubbing tank are lifted out and thoroughly cleaned, and the neutralizing solution is renewed from time to time. The solution and sludge are drained from the lower valve 57 until oil appears, and new solution is admitted to the level of the upper valve 57. The filter pad 129 also requires periodic renewal, the holder 130 being removed from the housing 25 for this purpose. When removing the holder, the rotary arm 125 is slid up on the shaft 124, as indicated in Fig. 1. The trap 70 is cleaned through the top opening of the neutralizing tank.

What I claim as new and desire to secure by Letters Patent is:

1. In an oil reclaimer, a still for removing volatile matter from oil, ventilating means for said still, and means influenced by still temperature to control said ventilating means and to insure operation of said ventilating means at any temperature of the still above a predetermined value.

2. In an oil reclaimer a still for removing volatile matter from oil, a filter compartment supplied with oil from said still, and means for conducting vapors from said compartment through said still.

3. In an oil reclaimer, an oil-receiving tank, a regulating tank to which oil flows by gravity from said receiving tank, a neutralizing tank, a scrubbing tank, oil conduit connections between said successive tanks for gravity flow of oil, a still having a conduit connection with said scrubbing tank for gravity flow of oil to said still, and a filter receiving oil by gravity from said still, said regulating tank maintaining a substantially constant head of oil for causing oil to flow by gravity through the successive instrumentalities.

4. In an oil reclaimer, a still for removing volatile matter from oil and having a vapor inlet and a vapor outlet, a filter compartment supplied with oil from said still and communicating with said vapor inlet, and suction means connected to said outlet for drawing off vapors from said still and from said filter compartment, the vapor from said filter compartment passing through said still.

5. In an oil reclaimer the combination of a still for removing volatile matter from oil, heating means for said still, means for removing vapors from the still, and means controlled by still temperature for maintaining said vapor-removing means in operation until the still cools to a safe temperature lower than the normal operating temperature of the still.

6. In an oil reclaimer, the combination of a still for removing volatile matter from oil, heating means for said still, means for removing vapors from the still, and means controlled by still temperature for automatically rendering said vapor-removing means effective when the temperature of the still rises during the warming-up period to a predetermined temperature lower than the normal operating temperature.

FRANK A. HEADSON.